United States Patent [19]

Hogan et al.

[11] 4,426,901

[45] Jan. 24, 1984

[54] CRUSH CUTTER

[75] Inventors: James E. Hogan, Canton; George M. Camplair, Clinton, both of Ohio

[73] Assignee: The Firestone Tire & Rubber Company, Akron, Ohio

[21] Appl. No.: 321,983

[22] Filed: Nov. 16, 1981

[51] Int. Cl.³ .............................. B26F 3/10; B26F 3/04
[52] U.S. Cl. .......................................... 83/861; 83/16; 83/171; 83/875; 225/2; 225/96; 225/101
[58] Field of Search ................. 83/16, 171, 422, 261, 83/861, 875; 225/2, 96, 101, 4; 264/160, 163; 425/294, 315

[56] References Cited

U.S. PATENT DOCUMENTS

| | | | |
|---|---|---|---|
| 2,042,829 | 6/1936 | Carlin | 83/171 |
| 2,429,944 | 10/1947 | Rayburn et al. | 225/4 |
| 2,733,766 | 2/1956 | Wikle | 83/210 X |
| 3,505,145 | 4/1970 | Martensson et al. | 225/4 X |
| 3,809,306 | 5/1974 | Muhlbach et al. | 264/160 X |
| 4,009,237 | 2/1977 | Kimura et al. | 264/163 X |
| 4,069,727 | 1/1978 | Sparks et al. | 83/171 X |
| 4,345,452 | 8/1982 | Eberle | 83/260 X |

*Primary Examiner*—Frank T. Yost
*Attorney, Agent, or Firm*—Ronald Brietkrenz

[57] ABSTRACT

A cutter employing two heated eccentrically mounted rollers adapted to coact with each other in order to sever a material by means of a crushing action is utilized in conjunction with a transport member to cut predetermined lengths of material from a continuous roll of said material. The cutting action of the heated rollers provides cut ends of the material which may be readily spliced together without the use of gum strips.

13 Claims, 26 Drawing Figures

CRUSH CUTTER

BACKGROUND OF THE INVENTION

1. Field of the Invention

This invention relates to a cutting means and more particularly to a cutting means adapted to sever materials by means of a crushing action. Specifically, the instant invention relates to a cutting means employing two heated eccentrically mounted rollers adapted to coact with each other in order to sever a material by means of a crushing action and which is particularly adapted to cut the innerliner material used in the fabrication of tires from a continuous length of innerliner material.

2. Description of the Prior Art

The use of cylindrically shaped members to cut materials from a continuous length of material is well known as evidenced by U.S. Pat. No. 2,420,525 to DeLoye and U.S. Pat. No. 3,448,594 to Macon. In general, this art discloses the use of rollers to effect separation of a substantially continuous material at regular weakened portions thereof by causing stresses at the weakened portions which result in separation of the material at the weakened portions.

Apparatus utilized to produce weakened portions or serrations in a substantially continuous length of material are well known in the art as evidenced by U.S. Pat. No. 3,214,502 to Schaar, U.S. Pat. No. 3,570,337 to Hogan, U.S. Pat. No. 4,009,237 to Kimura, et al., and U.S. Pat. No. 4,181,070 to Robbins, et al. This art generally discloses a rotary means for scoring or causing a partial separation in a continuous length of material wherein said continuous length of material may in a subsequent operation be severed or separated at the scores or serrations to produce the desired length of the material.

Transfer machinery adapted to transfer a substantially continuous length of material for performing operations thereon is well known in the art as evidenced by U.S. Pat. No. 4,151,038 to Bottasso, et al., which discloses the use of linearly movable fingers to impart motion to a continuous length of material.

The use of a rotary die to cut a continuous length of material is disclosed in U.S. Pat. No. 3,905,283 to Baker.

Although the above-noted prior art discloses several methods for cutting continuous lengths of material, the method employed in the fabrication of a tire differs substantially from them. Specifically, the tire industry typically employs a tire assembly machine having a tire building drum to which the various components of a tire are manually applied by an operator. A gum strip is first applied laterally across the tire building drum. The first edge of the air impervious innerliner is then applied to the gum strip on the tire building drum such that the first edge of the innerliner material is located approximately in the middle of the gum strip. The tire building drum is then caused to be rotated by the operator, which rotating motion causes the innerliner material to be drawn from a material server adjacent to the tire building drum. When the tire building drum has completed one revolution, the rotary motion of the tire building drum is stopped. The operator then manually determines the point at which the continuous length of innerliner material must be cut in order to provide a small overlap of the innerliner material with the first edge of the innerliner material and then subsequently cuts the innerliner material with either a knife or a scissors. The ends of the innerliner material are then manually stitched and the remainder of the materials are applied to the tire building drum over the innerliner material by the operator.

It should be noted that it is necessary to apply the gum strip to the inner joint between the two ends of the innerliner material in order to prevent subsequent contamination of the joint between the two ends of the innerliner material by release compounds applied to the inside of the tire prior to vulcanization of the tire. It has been found that contamination of the joint between the two ends of the innerliner material by release compounds applied prior to vulcanization may result in incomplete bonding between the ends of the innerliner material with subsequent separation of the innerliner ends which results in cracking and failure of the innerliner material and subsequently tire failure.

The manual application of the gum strip to the tire building drum by the operator increases the amount of time required to make a tire and necessitates the stocking of the gum strips thereby increasing the cost required to make a tire. In addition, the use of the gum strip requires the stocking of the special gum strip material which increases the manufacturing cost of the tire. Further, the gum strip material is incompatible with the other components of the tire due to its formulation. Therefore, should gum strip material be mixed with other components of the tire, there is a high probability of tire failure. Elimination of the use of the gum strip thus represents an improvement in the quality of the tires manufactured. Even further, the use of an additional component, namely the gum strip, also provides an additional area for manufacturing error which would be eliminated by eliminating the use of the gum strip.

There is, therefore, a need for a means for automatically cutting a continuous strip of innerliner material to the correct length for application to a tire building drum to thereby eliminate a manual cutting operation required of the operator with the advantage of increasing production and reducing operator fatigue. There is also a need for a means for joining the two ends of the innerliner material without using a gum strip on the joint thereof.

The instant invention solves these problems by providing a means of automatically cutting from a continuous length of innerliner material, a portion of the exact length required in fabricating a tire and even further cuts the innerliner material in such a manner as to allow the joining of the ends of the cut piece of innerliner material without having to use a gum strip on the joint between the ends of the innerliner material.

SUMMARY OF THE INVENTION

The present invention relates to a means for cutting a continuous strip of material and more particularly to a pair of heated eccentrically mounted rollers which coact with each other upon rotation about their eccentric mounting to crush the material passed therebetween in order to cut the material. A transfer mechanism is provided for use in conjunction with the rollers in order to automatically cut a predetermined length of material by means of the above described crushing between the pair of heated rollers. The cutting action of the pair of rollers provides an edge on the cut material that may be readily spliced to another cut end without the necessity of using a gum strip to avoid contamination of the joint.

DESCRIPTION OF AN EXEMPLARY EMBODIMENT

Figures 1, 10:
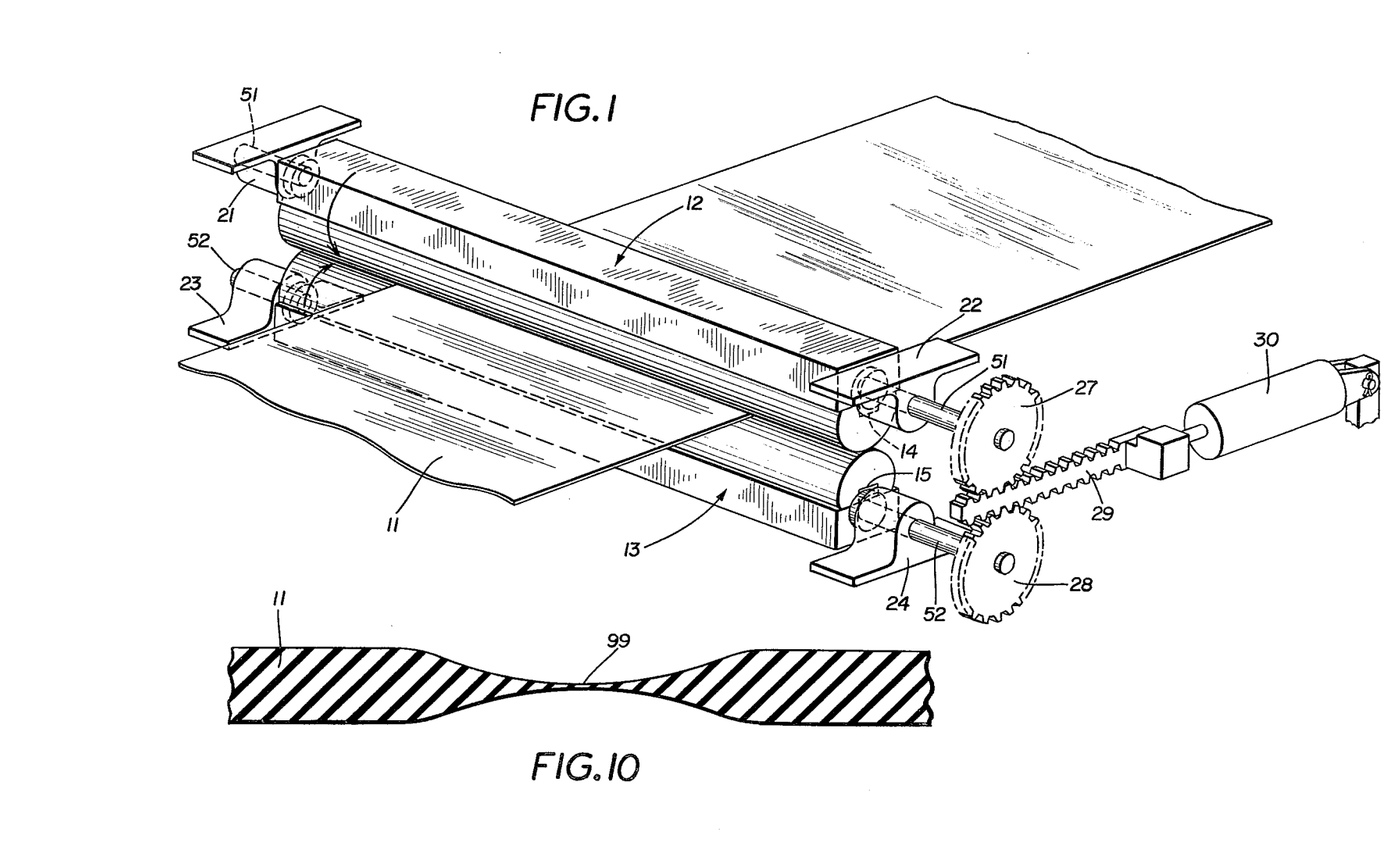
FIG. 1 is a simplified perspective view of the cutting means employed by the instant invention.
FIG. 10 is a cross-section of the work after being crush cut.

Referring now to FIG. 1 of the drawings, there is disclosed a simplified perspective view of the cutting means employed in the instant invention. Specifically, there is shown a continuous length of material 11 which is interposed between roller assemblies 12 and 13. The roller assemblies 12 and 13 rotate about shafts 51 and 52 respectively which are journaled in bearings 21, 22 and 23, 24 respectively. Means for rotating the roller assemblies 12 and 13 are provided by gears 27 and 28 fixedly attached to the shafts 51 and 52 respectively. Interposed between the gears 27 and 28 is rack 29 which is linearly displaced by means of air cylinder 30. The roller assemblies 12 and 13 are heated by means of cartridge heaters 14 and 15.

It can thus be seen that there are provided means for rotating the heated roller assemblies 12 and 13 about the axis of their respective supporting shafts in order to cause the relative distance between the roller assemblies 12 and 13 to be varied due to the eccentric mounting of the roller assemblies. When the roller assemblies 12 and 13 assume a substantially contacting position, the material 11 disposed between the roller assemblies 12 and 13 will be partially or completely severed depending on the clearance between the roller assemblies, the temperature of the roller assemblies and the length in time of the cutting cycle.

Figure 2:
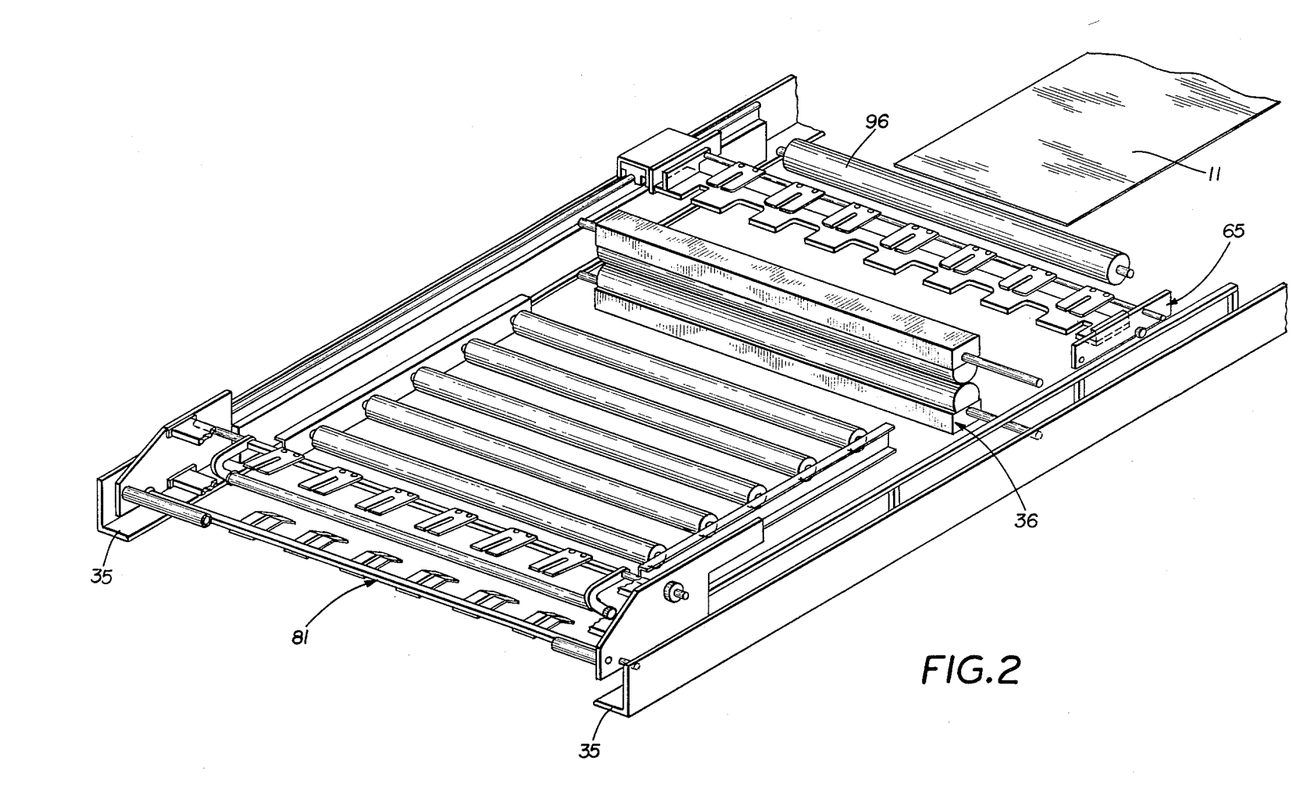
FIG. 2 is a simplified perspective view of the instant invention.

Referring now to FIG. 2 of the drawings, there is disclosed an overall perspective view of the instant invention. The instant invention is adapted to be used in conjunction with a standard stock server employed to feed material from continuous rolls to a tire assembly machine which includes a tire building drum that is employed to fabricate a tire. Both the stock server and the tire assembly machine are conventional machines well known to one skilled in the art. The instant invention, as disclosed in FIG. 2 of the drawings, is designed to replace one of the server trays of a conventional stock server.

The instant invention is employed in conjunction with a stock server in order to remove material from a continuous length of material located within the stock server and to further cut the material into predetermined lengths and even further to provide cut ends which may be readily spliced together without using a gum strip.

The stock enters the instant invention from the rear over the feed roller 96 where the end of the material 11 is grasped by cutter clamp assembly 65. Cutter clamp assembly 65 is adapted to be moved forward to the front of the instant invention through the crush cutter assembly 36 to the builder clamp assembly 81 where the end of the stock is transferred from the cutter clamp assembly 65 to the builder clamp assembly 81. The cutter clamp assembly 65 is then caused to return to its initial position.

After the cutter clamp assembly 65 has returned to its initial position, the cruch cutter assembly is employed to partially cut the material disposed between two eccentrically mounted rollers contained within the crush cutter assembly 36. After the material has been partially severed by the roller members of the crush cutter assembly 36, the material 11 is removed from the roller members to which the material 11 sticks by the cutter clamp assembly 65 after which the cutter clamp assembly 65 is again returned to its initial position. The returning to the initial position, the cutter clamp assembly 65 causes the material to be completely severed wherein the operator of the tire assembly machine may release the builder clamp assembly 81 and remove the cut predetermined length of material from the instant invention over server roll 92 in order to use the length of material in the construction of a tire. This sequence of operations may then be repeated in order to cut additional lengths of material from a continuous roll of material.

As more fully disclosed below, the crush cutter assembly 36 may be displaced along the support rails 35 in order to vary the distance between the crush cutter assembly 36 and the builder clamp assembly 81 in order to allow the length of material cut by the instant invention to be varied in accordance with the distance between the builder clamp assembly 81 and the crush cutter assembly 36.

Figure 3:
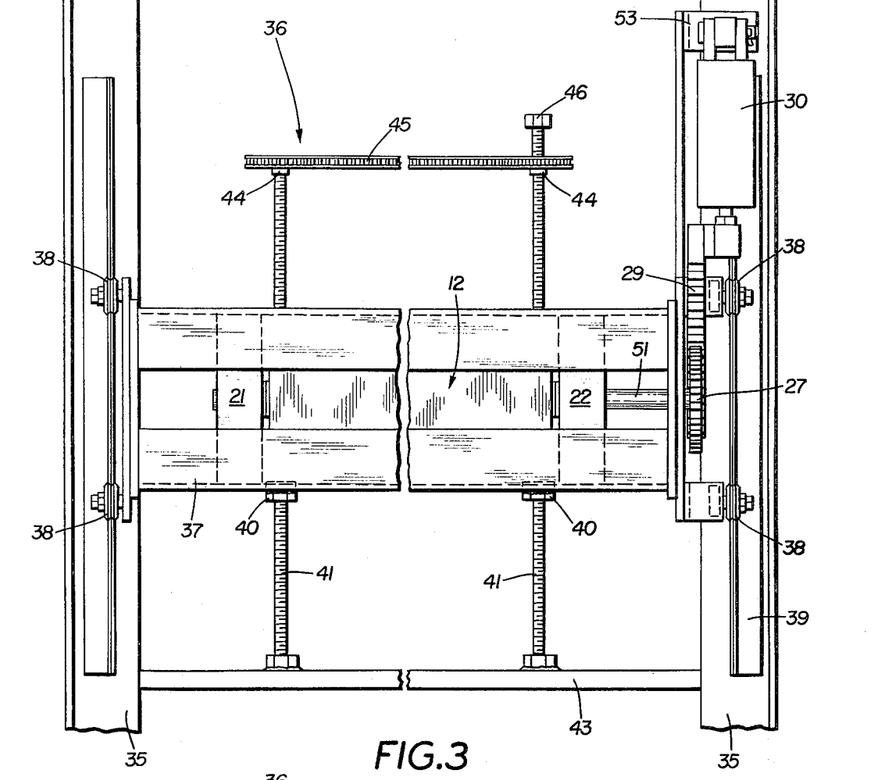
FIG. 3 is a plan view of the crush cutter assembly showing the details of construction thereof.
Figure 4:
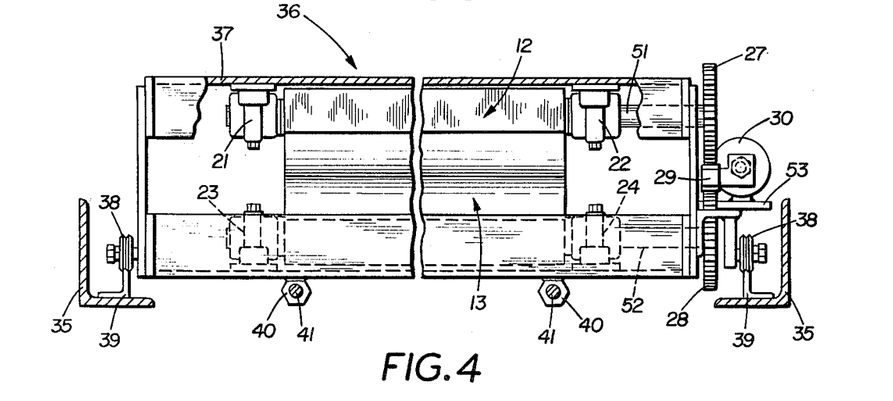
FIG. 4 is a front elevation of the crush cutter assembly shown in FIG. 3 with portions broken away.
Figure 5:
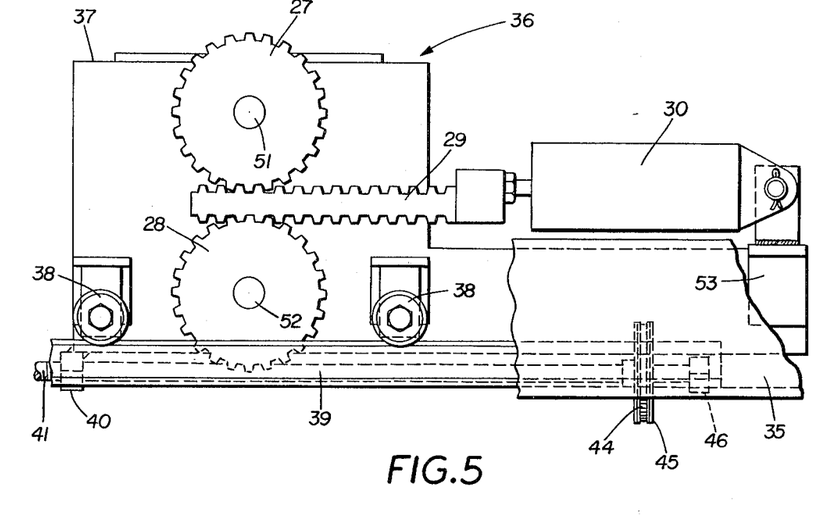
FIG. 5 is a right side elevation of a portion of the crush cutter assembly shown in FIG. 3.

FIGS. 3, 4 and 5 of the drawings disclose details of construction of the crush cutter assembly 36 employed in the instant invention to sever the innerliner material.

The crush cutter assembly 36 is comprised of a crush cutter frame assembly 37 which houses the roller assemblies 12 and 13. Rotatably attached to the crush cutter frame assembly 37 are support rollers 38. Disposed at each end of the crush cutter frame assembly 37 are two support rollers 38 adapted to coact with adjustment track 39 in order to allow movement of the crush cutter assembly 36 along the adjustment track 39 by means more fully described below. The adjustment tracks 39 are affixed to the support rails 35 and are generally aligned therewith.

Fixedly attached to the bottom of the crush cutter frame assembly 37 are two lead screw nuts designated 40 which engage lead screws 41. As more clearly shown in FIG. 3 of the drawings, the lead screws 41 each have one end thereof journaled in a lead screw bearing 42 which is fixedly attached to lead screw bearing support 43 which is in turn affixed to the main support rails 35. Attached to the opposite ends of the lead screws 41 are sprockets 44 both of which are engaged by chain 45 such that rotation of one of the lead screws 41 will cause a corresponding rotation of the other lead screw. Fixedly attached to one of the lead screws 41 is adjusting nut 46 adapted to be engaged by a standard socket-type wrench in order to impart a rotary motion to the lead screws 41 to thereby cause the lead screw nuts 40 to traverse the threads of the lead screws 41 thus causing a displacement of the crush cutter assembly 36 along the adjustment track 39.

Disposed within the crush cutter frame assembly 37 are roller assemblies 12 and 13 journaled in bearings 21, 22 and 23, 24 respectively (see FIG. 4). Attached to the ends of the roller assemblies 12 and 13 by means of shafts 51 and 52, as more clearly shown in FIG. 4 of the drawings, are drive gears 27 and 28 respectively. Rack 29 is engaged with both drive gears 27 and 28 such that a linear motion of the rack 29 causes a rotation of both drive gears 27 and 28 and hence a rotation of their respectively attached roller assemblies 12 and 13. The rack 29 is linearly displaced by air cylinder 30 which has its rod end fixedly attached to the rack 29 and its barrel end pivotly attached to mounting bracket 53 which is in turn fixedly attached to the crush cutter frame assembly 37. There is thus provided a means for imparting rotary motion to the roller assemblies 12 and 13 in order to allow the eccentrically mounted rolls to vary the displacement between the two roller assemblies.

In the exemplary embodiment, a rack and gears are employed to impart rotary motion to the roller assemblies 12 and 13 in order to provide a relatively constant rotation of the roller assemblies 12 and 13. It has been found that a relatively constant rotation of the roller assemblies 12 and 13 provides the best cutting action.

It may be readily appreciated that the speed of the rotation of the roller assemblies 12 and 13 may be regulated by regulation of the air flow to air cylinder 30. In the exemplary embodiment, the air flow to the air cylinder 30 is regulated by an adjustable one-way flow regulator provided on each of the ports of the air cylinder 30. For optimum cutting, the cutting time of the roller assemblies 12 and 13 should be approximately 6-9 seconds.

Figure 6:
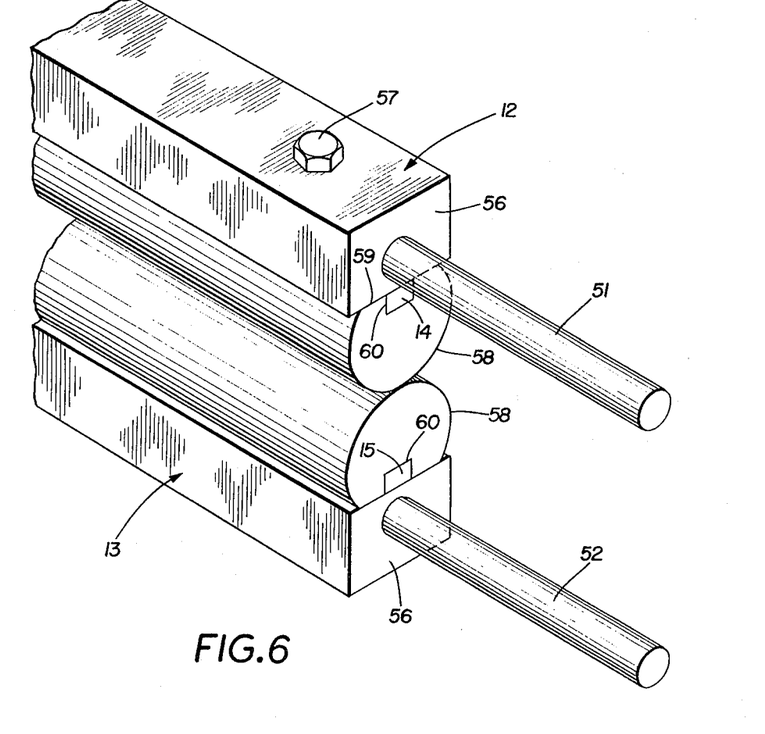
FIG. 6 is an enlarged perspective view of one end of the roller assemblies.

Referring now to FIG. 6 of the drawings, there are shown details of construction of the roller assemblies 12 and 13. The roller assemblies 12 and 13 are of identical construction comprising a rectangularly shaped mounting member 56 which has a hole drilled in each end thereof to facilitate insertion therein of shaft 51 which is held in the hole in mounting member 56 by an interference fit. Bolted to the mounting member 56 by bolt 57 is roller member 58 which has a generally cylindrical outer configuration except for a flat section 59 which has a rectangularly shaped groove 60 formed therein for the entire length of the roller member 58. There is thus provided an eccentrically mounted roller member which may be readily fabricated from common structural shapes.

In the exemplary embodiment, the roller member 58 is chrome plated steel in order to reduce the sticking of the material 11 to the roller assembly after the material has been partially cut by the crush cutter assembly. In an alternative embodiment, the roller member 58 may be constructed of stainless steel in order to reduce the sticking of the material 11 to the roller member 58. Sticking of the material 11 to the roller members 58 may also be eliminated by the use of a Teflon coating on the roller members 58 in non-tire applications. The rectangularly shaped grooves 60 in the roller members 58 are adapted to receive correspondingly shaped heating elements 14 and 15 which are of substantially the entire length of the roller members 58. The heating element is chosen in order to provide sufficient heat to the roller members 58 in order to maintain the roller members 58 at a temperature of approximately 255°-275° F. The heating of the roller members 58 substantially enhances the cutting action of the crush cutter assembly 36. In the exemplary embodiment, the heating elements 14 and 15 are Model No. SSC-25-280 0A 420 watt cartridge heaters manufactured by Hotwatt, Inc., 128 Maple Street, Danvers, Mass.

It may now be appreciated that there is thus provided a cutting means comprised of two heated eccentrically mounted roller assemblies which are adapted to be rotated in order to assume a substantially contacting position whereby the material placed between the roller assemblies is substantially severed by the crushing action of the rollers in conjunction with a partial transformation of the state of the material being cut due to the heating of the roller members.

Figure 7:
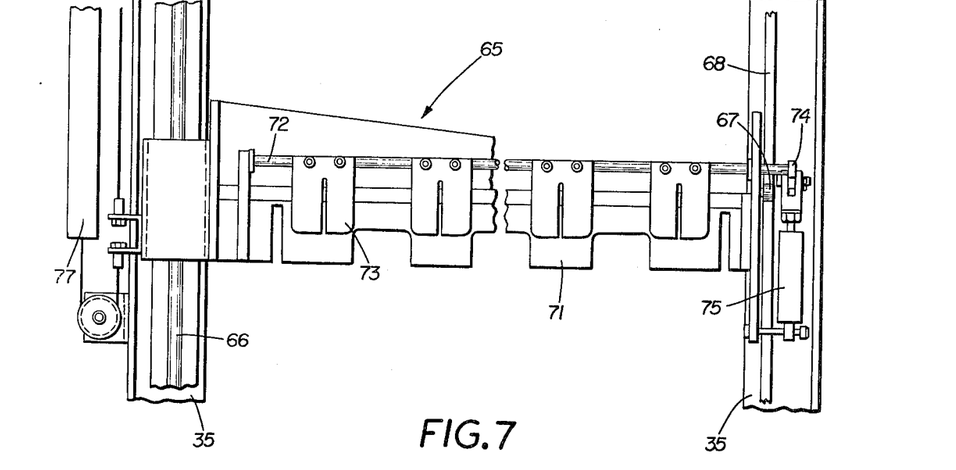
FIG. 7 is a plan view of the cutter clamp assembly showing the details of construction thereof.
Figure 8:
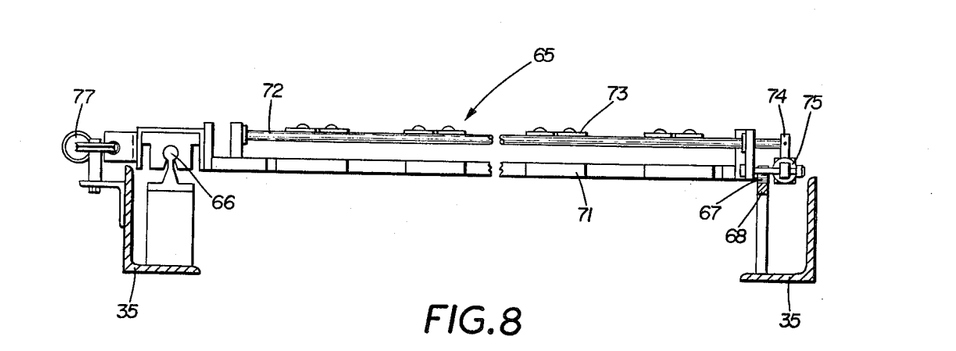
FIG. 8 is a front elevation of the cutter clamp assembly shown in FIG. 7.
Figure 9:
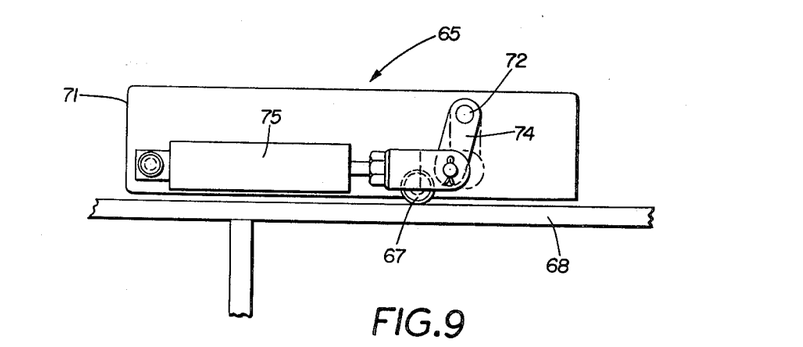
FIG. 9 is a right side elevation of a portion of the cutter clamp assembly shown in FIG. 7.
Figure 11:
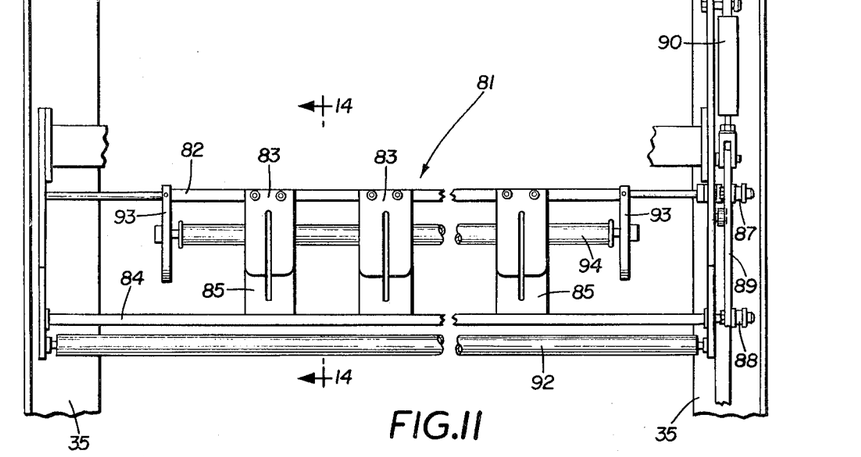
FIG. 11 is a plan view of the builder clamp showing the details of construction thereof.
Figure 12:
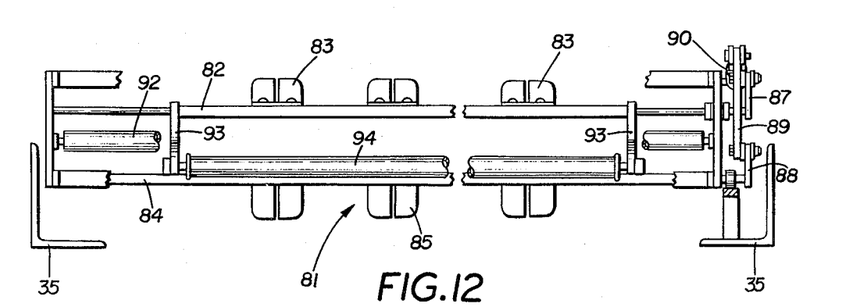
FIG. 12 is a front elevation of the builder clamp shown in FIG. 11 with portions broken away.

The cutter clamp assembly 65 is more fully disclosed in FIGS. 7, 8 and 9 of the drawings. The cutter clamp assembly 65 is adapted to grip the material 11 near its cut end and transport the material 11 through the crush cutter assembly 36 to the builder clamp assembly 81 where it transfers the end of the material 11 from the cutter clamp assembly 65 to the builder clamp assembly 81 and then returns to its initial position intermediate the crush cutter assembly 36 and the feed roll 96. The cutter clamp assembly 65 is also utilized to assist in stripping the material 11 from the roller members 58 after the crush cutter assembly 36 has substantially severed the material 11 after a cutting cycle.

The cutter clamp assembly 65 is mounted on the support rails 35 by means of linear bearing assembly 66 on the one side and roller 67 adapted to traverse rail 68 on the other side of the cutter clamp assembly. The linear bearing assembly 66 and the rail 68 extend substantially the entire length of the support rails 35 and are substantially parallel therewith. In the exemplary embodiment, the linear bearing assembly 66 is a Model No. SA8-36 linear bearing manufactured by Linear Industries, Ltd., Los Angeles, Calif.

Interposed between the linear bearing assembly 66 and the roller 67 is base plate 71 extending between the linear bearing assembly 66 and the roller 67 and further having cutouts therein forming fingers which are adapted to coact with gripping fingers described below. Rotatably mounted above the base plate 71 is pivot shaft 72 to which are affixed fingers 73 positioned above like shaped fingers of the base plate 71. In the exemplary embodiment, the fingers 73 are composed of a relatively thin piece of spring steel material having a slot therein in order to allow the edge of the finger 73 to more closely conform to the material 11 disposed between the fingers 73 and the base plate 71.

Means for causing the rotation of the pivot shaft 72 and its fingers 73 about the axis thereof are more fully shown in FIG. 9 of the drawings wherein a link 74 is fixedly attached at one end thereof to the pivot shaft 72. The opposite end of the link 74 is pivotly attached to the rod end of air cylinder 75 which has its barrel end pivotly mounted to the base plate assembly 71. It may now be appreciated that upon actuation of the air cylinder 75, the pivot shaft 72 will be rotated about its axis of rotation thereby causing the fingers 73 to either be rotated into or out of engagement with the corresponding fingers of the base plate assembly 71. It may thus be seen that there is provided a means for readily grasping the end of a material 11.

The cutter clamp assembly 65 is linearly displaced along the linear bearing assembly 66 and the rail 68 by means of cable cylinder 77. In the exemplary embodiment, the cable cylinder 77 is a Model No. S100-1ATP cable cylinder manufactured by Tol-O-Matic of Minneapolis, Minn. In order to facilitate the retraction of the cutter clamp assembly 65, the base plate 71 is covered with a release coating such as Teflon in order to reduce the friction between the cutter clamp assemblies 65 and the material 11.

Referring now to FIGS. 11, 12, 13 and 14, there are shown further details of construction of the builder clamp assembly 81 employed by the instant invention to grasp the severed end of the material 11. The builder clamp assembly 81 is fixedly mounted on the end of the support rails 35 and includes two sets of engaging fingers which are adapted to grip the material 11. A first pivot shaft 82 is provided to which are affixed fingers 83. The fingers 83 are comprised of a relatively thin spring steel material having slots therein and which are adapted to provide a gripping action on the material 11.

Located forward and below the pivot shaft 82 is pivot shaft 84 which has fingers 85 affixed thereto. The fingers 85 are adapted to coact with the fingers 83 in order to provide a gripping action on the material 11 disposed between the fingers 83 and 85. The relationship of the fingers 83 with respect to the fingers 85 is more clearly shown in FIG. 14 of the drawings. It may be observed that the fingers 83 are of a relatively straight configuration while the fingers 85 have a substantially bent portion therein. This substantially bent portion of the fingers 85 provides a surface for lifting and supporting the material 11 and against which fingers 83 may be placed in order to provide a locking action against the rearward movement of the material 11 when grasped by fingers 83 and 85.

Figure 13:
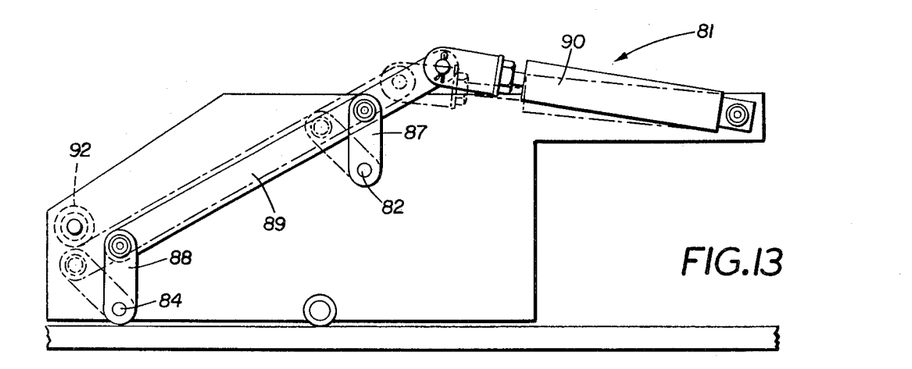
FIG. 13 is a right side elevation of the builder clamp disclosed in FIG. 12.
Figure 14:
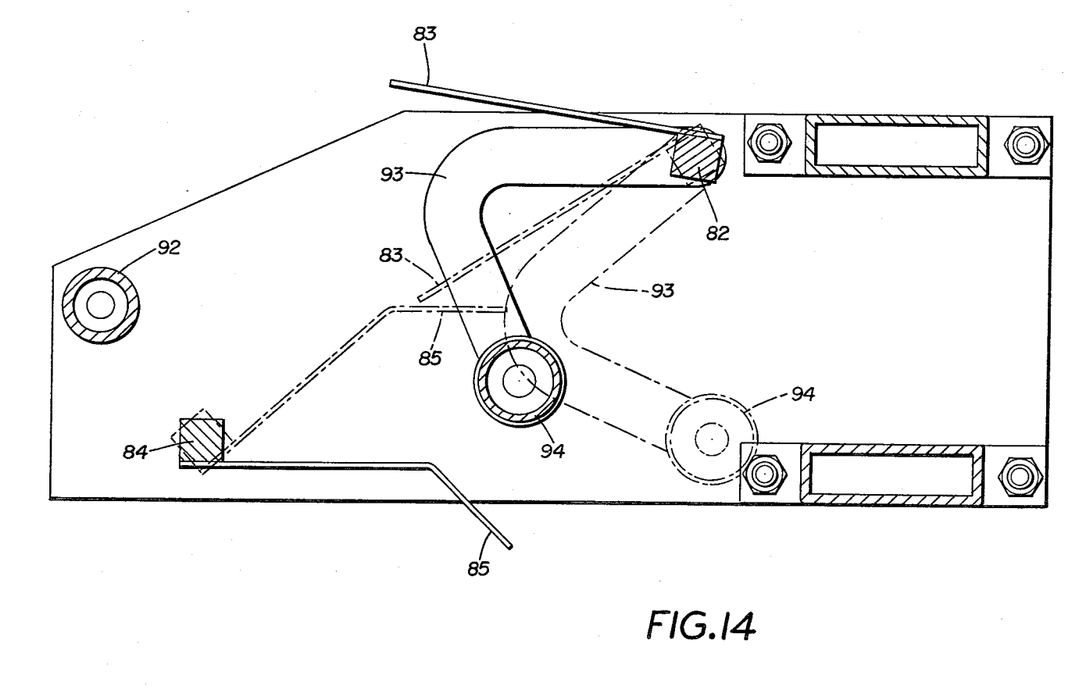
FIG. 14 is a sectional view of the builder clamp assembly taken along the lines 14—14 shown in FIG. 11.

The means for rotating the pivot shafts 82 and 84 is disclosed in FIG. 13 of the drawings. Fixedly attached to the pivot shaft 82 is link 87. Fixedly attached to the pivot shaft 84 is link 88. Pivotly connected to both links 87 and 88 is connecting link 89 which has one end thereof pivotly attached to the rod end of the cylinder 90, which cylinder has its barrel end pivotly attached to the builder clamp assembly 81.

It may be observed that as the cylinder 90 is actuated the links 87, 88 and 89 will cause the pivot shafts 82 and 84 to simultaneously rotate in order to cause the fingers 83 and 84 to assume either an engaged or disengaged relationship with respect to each other. The fingers 71, 73 of the cutter clamp assembly 65 are adapted to intermesh with fingers 83, 85 of the builder clamp assembly 81 in order to facilitate transfer of the material 11 between the fingers 71, 73 and 83, 85.

Affixed to the pivot shaft 82 are roller support arms 93 which support therebetween roller 94 which is employed to insure that the material 11 disposed between the fingers 83 and 85 does not droop in order to allow ready availability to the operator. A server roll 92 is provided on the front of the builder clamp assembly 81 from which the material 11 is drawn by the tire builder in order to facilitate its withdrawal from the builder clamp assembly 81.

Referring now to FIG. 10 of the drawings, there is disclosed a cross-sectional view of a piece of material 11 which has been partially severed by the crush cutter assembly 36. The tapered section of the material 11 generally conforms to the configuration of the roller members 58 and has a portion which has a relatively thin cross-sectional area 99 which is subsequently severed during the retraction of the cutter clamp assembly 65 to the rear of the crush cutter assembly 36 as described below in connection with the operating sequence of the instant invention.

The taper produced in the material 11 by the crush cutter assembly 36 may be varied by changing the relationship of the radius of the roller member 58 with respect to the eccentricity of the center line of the roller member 58 with respect to the center line of the axis of the shafts 51 and 52. In the exemplary embodiment, the ratio of the radius of the roller member 58 with respect to the eccentricity of the center line of the roller members 58 with respect to the center line of the shafts 51 and 52 should be approximately two. If it is desired to produce a longer taper having a larger portion with a substantially reduced cross-section, the above-noted ratio should be greater than two. It if is desired to produce a shorter taper having a smaller area of substantially reduced cross-section, the above-noted ratio should be less than two. The tapered ends of the material 11 allow the ends to be joined in such a manner as to eliminate the need for using a gum strip at the joined edges to prevent contamination of the joint by subsequently applied release compounds.

Figure 15:
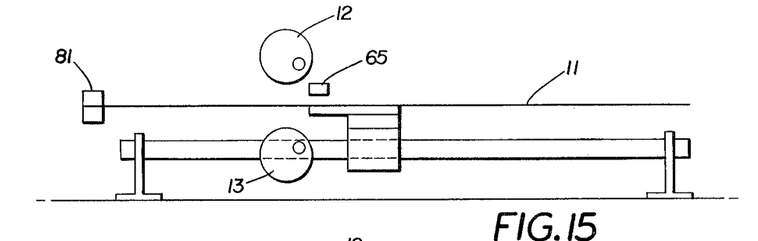
FIGS. 15-26 are schematic representations disclosing the operating sequence of the instant invention.

FIGS. 15 through 26 of the drawings schematically disclose a typical crush cutting cycle. In FIG. 15 of the drawings, there is shown what may be considered an initial position wherein the innerliner material 11 is clamped by builder clamp assembly 81, the roller assemblies 12 and 13 are rotated such that the distance between the rolls is at a maximum, and the cutter clamp assembly 65 is in an open position and located proximate and to the rear of the roller assemblies 12 and 13.

Figure 16:
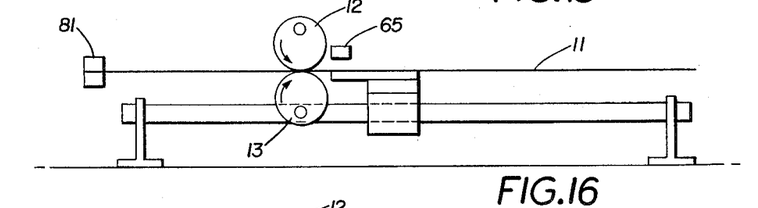

During the cutting sequence of the crush cutting cycle as shown in FIG. 16 of the drawings, the roller assemblies 12 and 13 are rotated as indicated by the arrows to cause the roller assemblies 12 and 13 to move closer together relative to each other until they have assumed a position of top dead center with respect to each other and have substantially severed the innerliner material 11. It may be appreciated that in the exemplary embodiment the clearance between the roller assemblies 12 and 13 in the top dead center position will be approximately 0–0.005 of an inch with the result that the innerliner material 11 will often not be completely severed but rather will be affixed to the continuous strip by a very thin piece of innerliner material.

Figure 17:
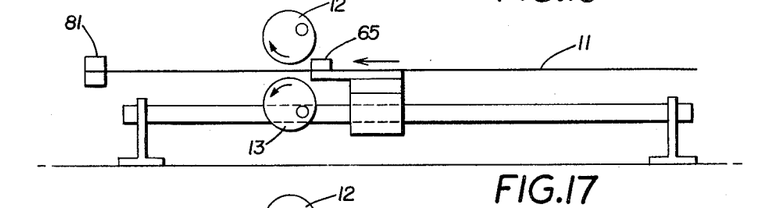

During the stripping operation of the crush-cutting cycle as disclosed in FIG. 17 of the drawings, the cutter clamp assembly 65 is closed as the roller assemblies 12 and 13 are rotated as indicated by the arrows. Simultaneously the cutter clamp assembly starts moving forward, thereby causing the innerliner material 11 which has a tendency to stick to the roller assemblies 12 and 13 to be stripped from the roller assemblies 12 and 13.

Figure 18:
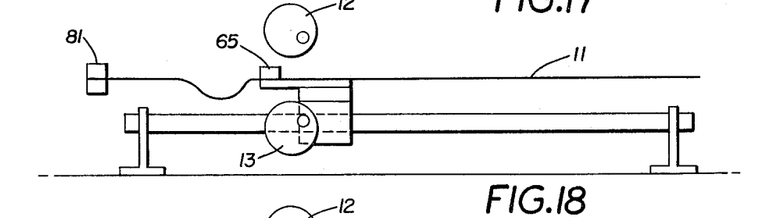
Figure 19:
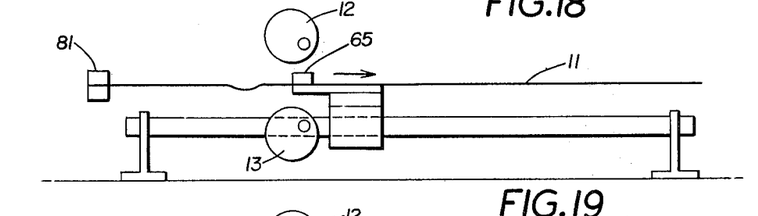

FIG. 18 of the drawings shows that portion of the stripping operation wherein the roller assembies 12 and 13 have been completely opened and the innerliner material 11 has been completely stripped from the roller assemblies 12 and 13 and the forward movement of the cutter clamp assembly 65 has stopped. The final sequence of the stripping operation is disclosed in FIG. 19 of the drawings wherein there is shown the reverse movement of the cutter clamp assembly 65 in a direction towards its initial position.

Figure 20:
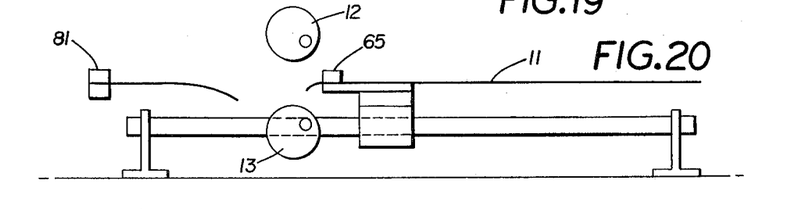

The result of this reverse movement of the cutter clamp transport is shown in FIG. 20 wherein the portion of innerliner material 11 to be cut from the continuous strip of innerliner material 11 has been separated at the point where the innerliner material 11 was crushed by the roller assemblies 12 and 13.

Figure 21:
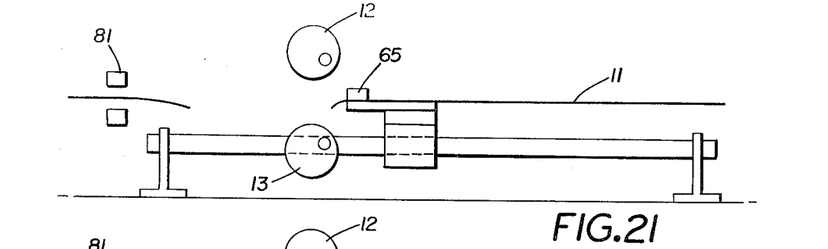

The portion of innerliner material 11 cut from the continuous strip of innerliner material 11 is now ready for use in the fabrication of a tire as schematically shown in FIG. 21 of the drawings.

Figure 22:
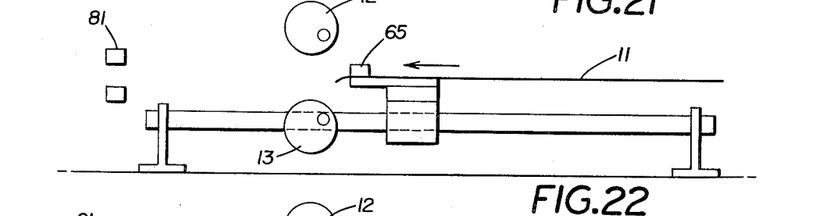

FIG. 22 of the drawings discloses that portion of the cutting cycle in which innerliner material 11 is transported toward the builder clamp assembly 81 by the cutter clamp assembly 65 in order to position the innerliner material 11 for a cutting operation by the roller assemblies 12 and 13.

Figure 23:
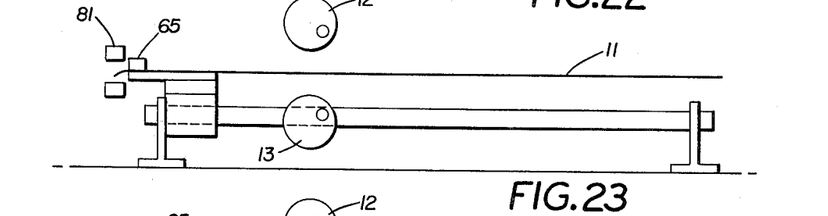

FIG. 23 of the drawings shows the cutter clamp assembly 65 in its fully advanced position wherein a portion of the innerliner material 11 is positioned between the fingers of the builder clamp assembly 81.

Figure 24:
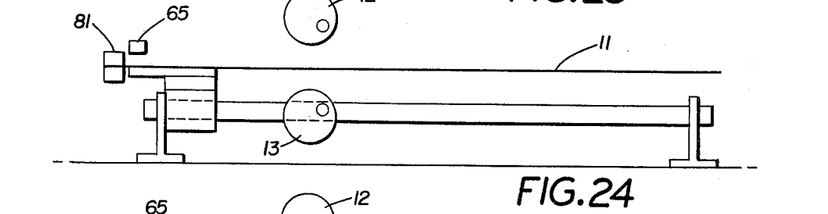

FIG. 24 of the drawings shows the builder clamp assembly 81 closed upon the innerliner material 11 and the cutter clamp assembly 65 released to thereby transfer the end of the innerliner material 11 from the cutter clamp assembly 65 to the builder clamp assembly 81.

Figures 25, 26:
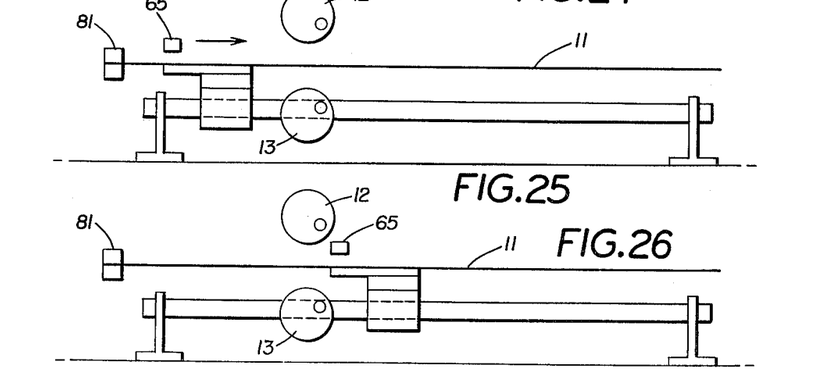

FIG. 25 of the drawings shows the cutter clamp assembly being retracted to its initial position.

FIG. 26 of the drawings shows the roller assemblies 12 and 13, cutting clamp assembly 65 and builder clamp assembly 81 in their initial position ready to begin another crush-cutting cycle.

Although the instant invention has been described in connection with the cutting of innerliner material, it should be appreciated that the instant invention may be employed to cut a wide variety of materials and that the type of cut, i.e., complete or partial, produced by the instant invention may be varied by varying the geometry of the roller members, the temperature of the roller members, the clearance between the roller members, the time parameters of the cutting cycle and the roller member materials.

It will be apparent to those skilled in the art that various modifications and additions may be made in the instant invention without departing from the essential features thereof, which are intended to be defined and secured by the appended claims.

What is claimed is:

1. An apparatus for cutting material, comprising:
   a. a first roller assembly having a curved surface adapted for eccentric rotation,
   b. a second roller assembly having a curved surface adapted for eccentric rotation wherein the curved surface of said first roller assembly may be positioned proximate to and in axial alignment with the curved surface of said second roller assembly in order to at least partially cut said material, and
   c. means for causing eccentric rotation of the curved surface of said first and second roller assemblies.

2. The apparatus of claim 1 wherein said first roller assembly has associated with it means for heating said first curved surface.

3. The apparatus of claim 2 wherein said first roller assembly has means for engaging said second roller assembly in order to cause said first roller assembly to rotate with said second roller assembly.

4. The apparatus of claim 2 wherein the curved surface of said first roller assembly has a release coating.

5. The apparatus of claim 2 including means for removing said deformable material from said apparatus.

6. An apparatus for cutting a deformable material comprising:
   a. a first roller adapted to be rotated about an axis eccentric to the center of said roller,
   b. a second roller adapted to be rotated about an axis eccentric to the center of said roller and further having the axis of said second roller parallel to the axis of said first roller wherein the periphery of said first and second rollers may be placed in proximate relationship by rotating said first and second rollers in order to at least partially cut said material, and
   c. means for rotating said rollers.

7. The apparatus of claim 6 wherein at least one of said rollers has heating means associated with it.

8. The apparatus of claim 7 including means for placing said deformable material between said first and second rollers.

9. In an apparatus for dispensing innerliner material from a continuous roll, the improvement comprising:
   a. means for cutting said innerliner material including at least one eccentrically mounted curved surface adapted to at least partially cut said material when eccentrically displaced whereby said cut edge of said innerliner material is tapered; and
   b. means for placing said innerliner material for cutting by said cutting means whereby a predetermined length of innerliner material may be cut.

10. The improvement of claim 9 wherein said cutting means comprises two roller assemblies each having a curved surface and in axial alignment with each other wherein the curved surfaces of said roller assemblies may be positioned proximate to each other in order to provide a cutting action.

11. The improvement of claim 10 wherein heating means are associated with said roller assemblies.

12. The improvement of claim 10 wherein said placing means comprises at least one set of engaging fingers which may be linearly displaced.

13. A method for cutting a material using two substantially parallel eccentrically mounted heated rollers comprising the steps of:
   a. placing said material between said rollers,
   b. rotating said rollers to a position wherein said rollers are immediately adjacent to one another whereby said material is at least partially cut,
   c. rotating said rollers to a position wherein said rollers are sufficiently far enough apart to remove said material from between said rollers, and
   d. removing said deformable material from between said rollers.

* * * * *